Figure 1:
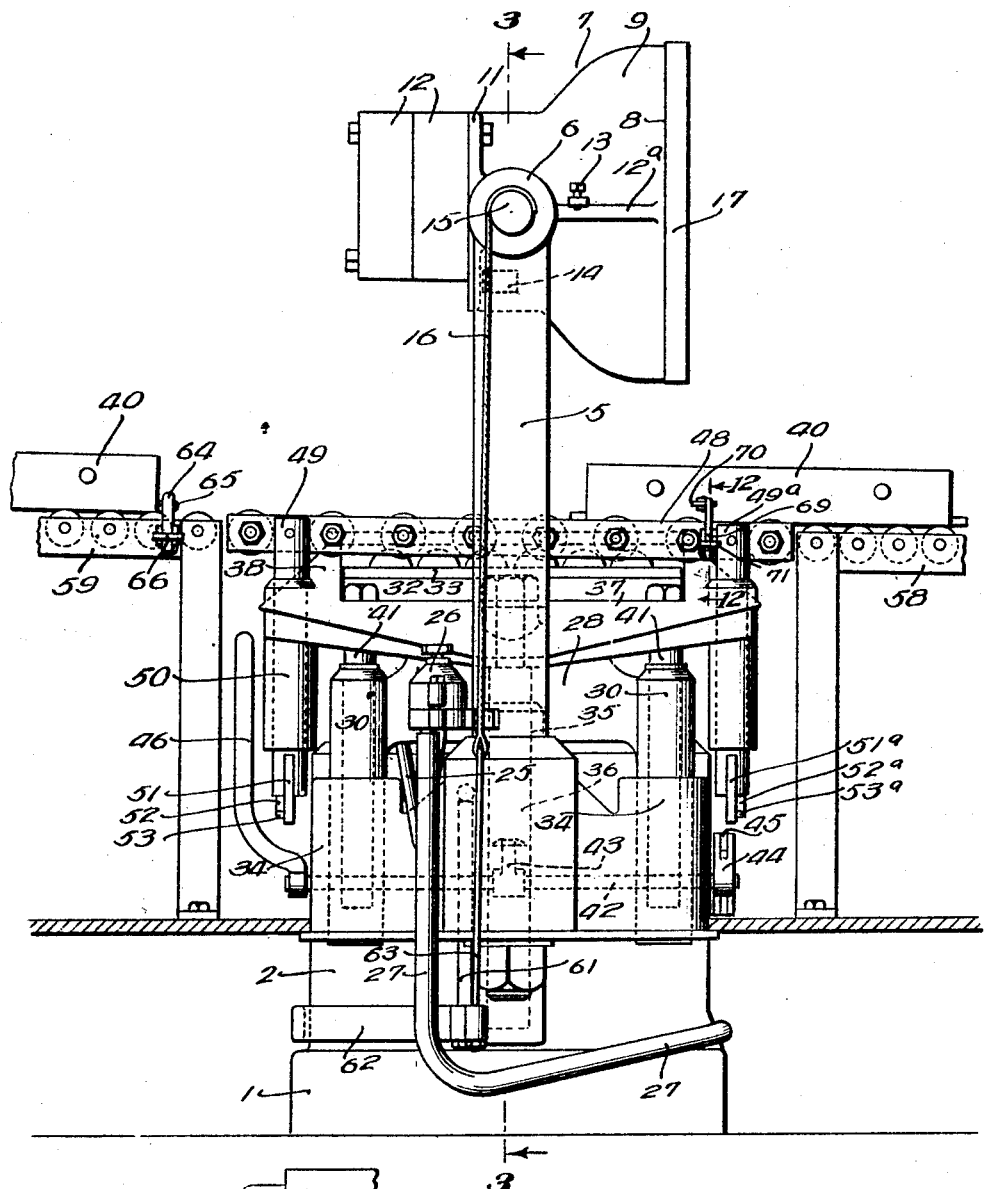

Jan. 24, 1928.
W. H. NICHOLLS
1,656,951
MOLDING MACHINE
Filed Feb. 18, 1925
5 Sheets-Sheet 3
Fig. 3.
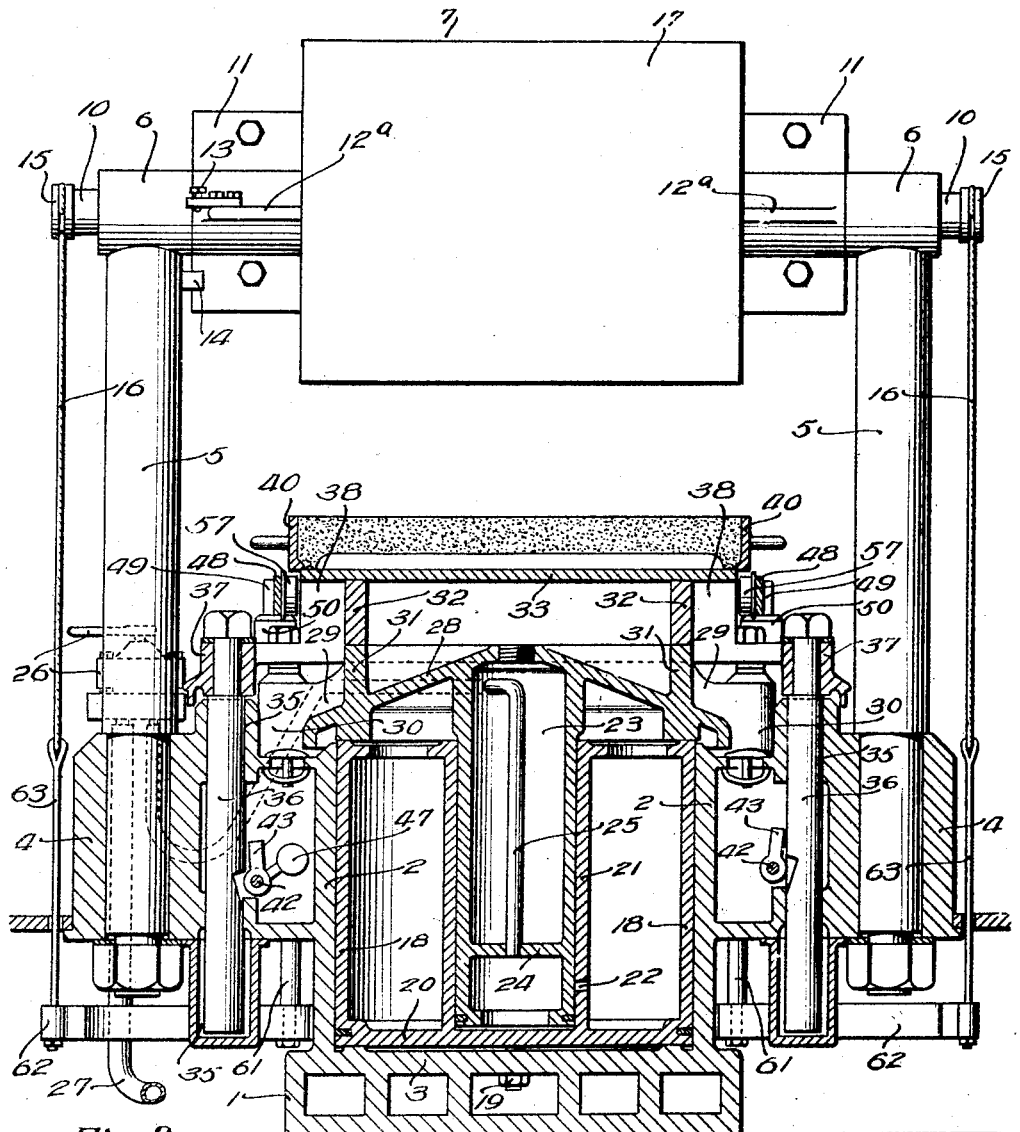
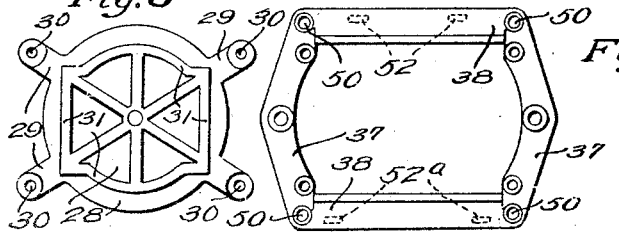
Fig. 9.
INVENTOR
William H. Nicholls.
BY
ATTORNEYS

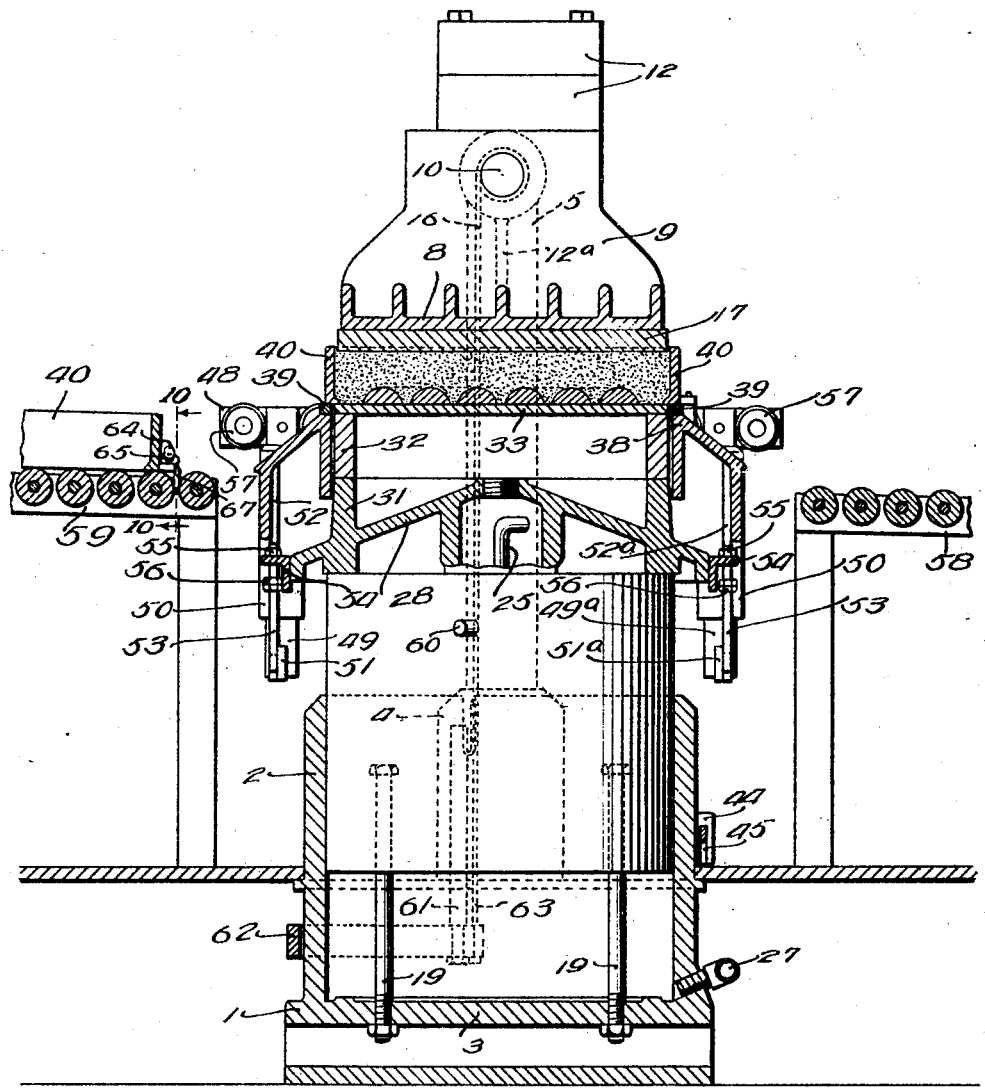

Jan. 24, 1928.

W. H. NICHOLLS 1,656,951

MOLDING MACHINE

Filed Feb. 18, 1925    5 Sheets-Sheet 5

INVENTOR
William H. Nicholls
BY
ATTORNEYS

Patented Jan. 24, 1928.

1,656,951

UNITED STATES PATENT OFFICE.

WILLIAM H. NICHOLLS, OF BROOKLYN, NEW YORK.

MOLDING MACHINE.

Application filed February 18, 1925. Serial No. 10,020.

The invention is illustrated as applied to a molding machine of the type shown in Patent No. 1,472,807, dated November 6, 1923. In machines of this type the flask, after being filled with sand, is jolted to pack the sand around the pattern, and after the jolting operation the sand is pressed or squeezed under a heavy pressure. After the squeezing operation the pattern is withdrawn from the mold and then the flask, with the complete mold therein, is lifted from the machine. These flasks are sometimes quite heavy and the removal of them from the molding machine is quite a laborious operation.

One of the important objects of this invention is to provide means whereby after the molding operation is finished and the pattern withdrawn from the mold the flask will be automatically lifted from the flask holding frame and positioned so that it may be rolled laterally away from the molding mechanism. In the embodiment of the invention described herein and shown in the drawings the flask lifting means is operated by the return of the mold making mechanism to its normal at rest position.

Another important object of the invention is to provide means whereby the upper presser head will automatically move away from the flask after the mold squeezing operation. As shown in the drawings and as described herein the upper presser head is automatically moved away from the mold by return of the mold making mechanism to its normal at rest position.

Another important object of the invention is to support the upper presser head by means of horizontal outwardly extending journals or stub shafts rigidly connected to the sides of the head, and to provide means whereby the mold making mechanism will swing the presser head upwardly and away from the mold by the downward movement of the mold-making mechanism.

There are other important objects and advantages of the invention which will hereinafter appear.

Figure 2:
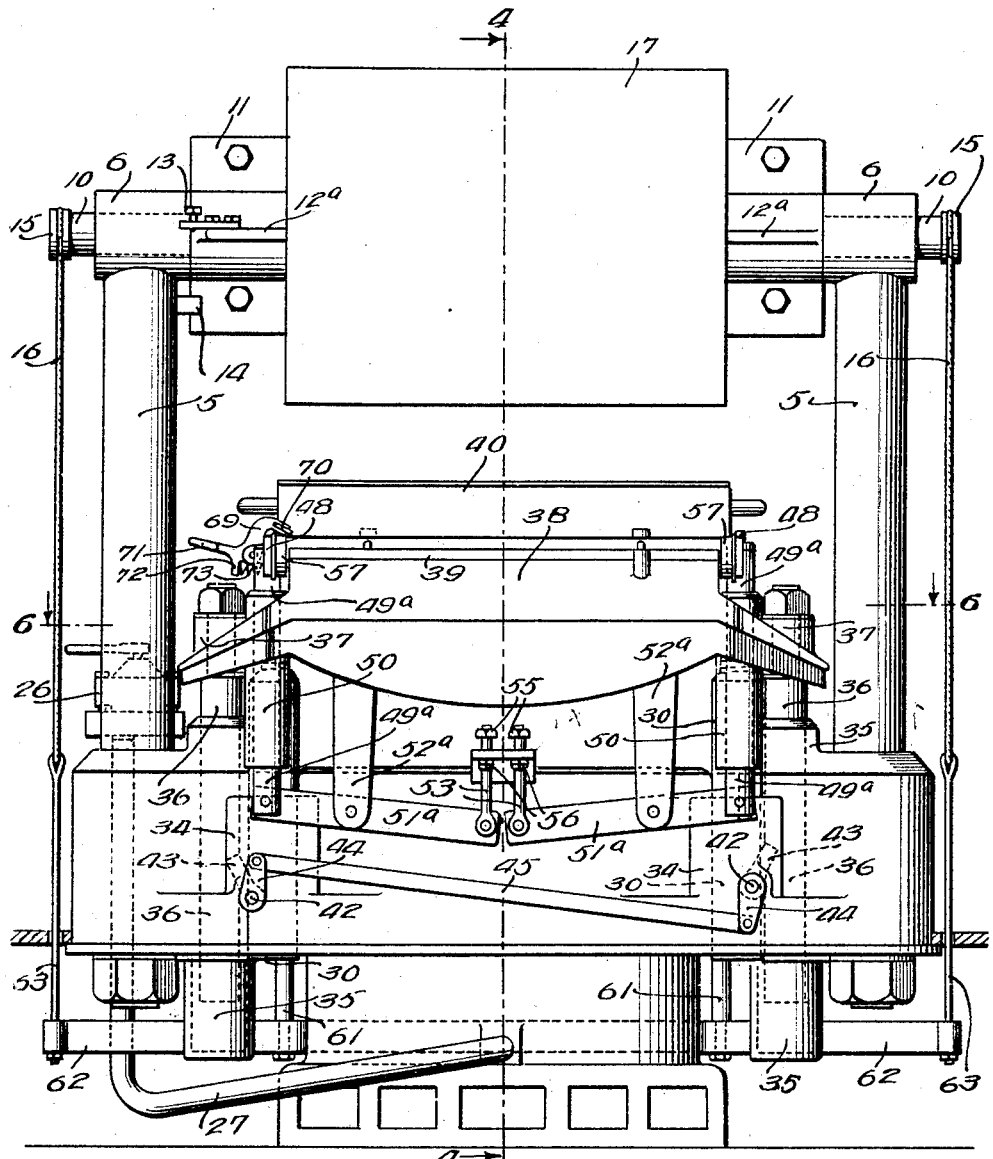
Figure 5:
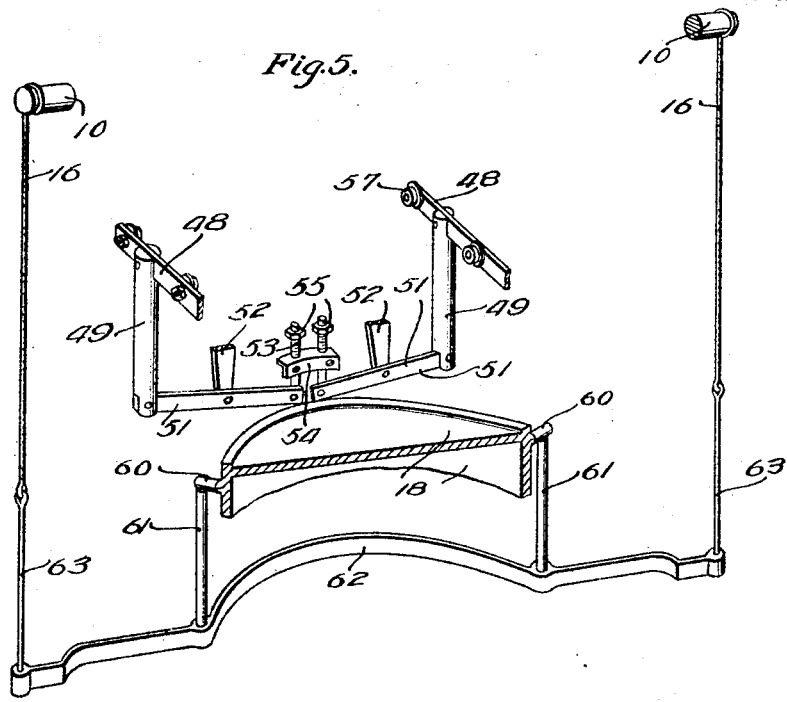
Figure 6:
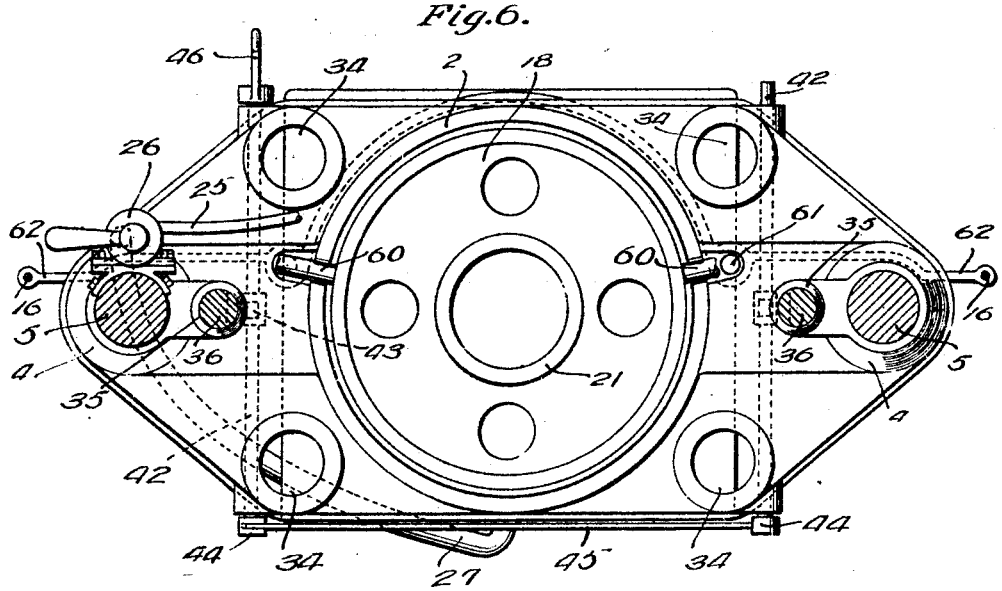

In the drawings, Fig. 1 is a side elevation of the machine showing the flask lifting means elevated;

Fig. 2 a rear elevation of the machine with the parts in the position shown in Fig. 1;

Fig. 3 a transverse, sectional view of the machine taken approximately on the line 3—3 of Fig. 1, the parts being in position ready for the squeezing operation;

Fig. 4 a longitudinal vertical sectional view of the machine showing the parts in position for the squeezing operation;

Fig. 5 a detail perspective view showing a portion of the flask lifting mechanism and the means for rocking the upper presser head;

Fig. 6 a plan view of the base of the machine showing the squeeze piston in place, a portion of the machine being shown in horizontal sectional view;

Fig. 7 a detail view of the upper presser head;

Fig. 8 a detail plan view of the jolt piston;

Fig. 9 a detail plan view of the flask supporting frame;

Fig. 10 a cross section on the line 10—10 of Fig. 4, showing the flask stopping means on the delivery track in stopping position;

Fig. 11 a view similar to Fig. 10, showing the flask stopping means in release position; and Fig. 12 a detail section on the line 12—12 of Fig. 1, showing the flask stopping means on the lifting track in release position.

Referring to the various parts by numerals 1 designates the base of the machine. This base carries a vertical cylinder 2 which is open at its upper end and closed at its lower end by a horizontal wall 3 which forms a part of the base. The base is formed at diametrically opposite points with two laterally extending horizontal extensions or arms 4. In each of these arms is rigidly mounted an upstanding rigid post 5, each post carrying at its upper end a horizontally disposed tubular bearing 6. The upper presser head 7 is formed with a pressure face 8 and the two upwardly extending side frames 9. Each side frame, near its upper end, is formed with an outwardly extending axle or stub shaft 10 which fits in the tubular bearings 6. The preponderance of weight is off the center of the axle 10 so that the presser head would normally tend to assume a position with the pressure face 8 horizontal and directly over the mold making mechanism. The side frames 9 are formed on their upper ends with laterally extending brackets or webs 11, to which are secured counter weights 12. These counter weights are slightly off center so that the preponderance of weight thereof will tend to swing the pressure face beyond its horizontal position. The side frames are also formed with laterally extending webs 12$^a$ on one of which is mounted an adjustable stop 13. This adjustable stop is adapted to contact with a rigid stop 14 projecting inwardly from one of the rigid posts 5. The adjustable stop 13 will engage the stop 14 when the pressure plate 8 is in a true horizontal position directly over the flask. The preponderance of weight of the counter weights 12 will hold these stops in engagement. The counter balance weights 12 are so arranged and so proportioned that it will require a very slight force exerted on the shaft 10 to rock the presser head into its upper inoperative position. Each stub shaft 10 is provided with a grooved rigid collar 15, around each of which is wound a cable 16. The lower end of these cables are connected to mechanism which will be hereinafter described. To the pressure face 8 is rigidly secured a presser board 17 which is adapted to enter the mold flask and to compress the sand therein during the mold squeezing operation.

In the cylinder 2 is fitted a large squeezing piston 18. The upward movement of this squeezing piston is limited by two headed bolts 19 rigidly secured in the bottom wall 3 and extending upwardly through the bottom wall of the squeeze piston. These bolts accurately guide the squeeze piston and the headed ends thereof limit the upward movement of said piston. The lower end of the squeeze piston is closed by a wall 20 and the upper wall of the piston is provided with openings to permit the escape of air therefrom and also to permit access to the guide bolts 19. A small vertically arranged cylinder 21 is formed on the center and within the squeeze piston, the upper end of this small cylinder being open and the lower end thereof being formed by the bottom wall of the squeeze piston. A short distance above the bottom of this cylinder 21 is formed an exhaust port 22. Mounted in the small cylinder 21 is a jolt piston 23. This piston 23 is provided with a cross wall 24 a short distance upwardly from its lower end. Extending through this cross wall is an air supply pipe 25 which leads out through the upper end of said piston and to an air control valve 26 mounted in any suitable position on the base for convenient manipulation by the operator. An air supply pipe 27 leads from the air control valve into the cylinder 2 below the squeeze piston 18. By properly manipulating the air control valve air may be admitted under the jolt piston for the jolting operation and then under the squeeze piston for the mold squeezing operation.

Formed integrally with the upper end of the jolt piston is a jolt and squeeze head 28. The lower end of this head is adapted to rest on the upper end of the squeeze piston. Formed on the head 28 are four radial diagonal arms 29 which carry vertically depending tubular sockets 30. On the upper surface of the head 28 are formed upwardly extending vertical flanges 31 which form a horizontal support for a rectangular pattern plate supporting frame 32. The said supporting frame may be secured to the head 28 in any suitable manner. The pattern plate 33 is rigidly secured to the upper side of the holding frame in a suitable manner. The sockets 30 reciprocate vertically through tubular guides 34 formed on the base, said tubular guides being supported by horizontal extensions of the base arranged between the arms 4 and the base. The sockets 30 are of considerable length and in the lowermost position of the jolt and squeeze pistons extend below the guides.

In the arms 4, adjacent the inner sides of the pistons 5, are formed vertical sockets 35, in which are mounted vertical plunger rods 36. The upper ends of these rods are connected to the end bars of a flask supporting frame 37. The end bars of said frame are connected together at their ends by the front and rear bars 38 so that the flask supporting means is an open rectangular frame having end bars and front and rear bars. This flask supporting frame surrounds the pattern plate holding frame and in its normal, or at rest, position is in substantially the same horizontal plane as said holding frame. On the front and rear bars of the flask holding frame are mounted flask receiving rails 39, said rails being suitably secured in position. The upper surfaces of the rails 39 are flush with the upper surface of the pattern plate when the jolt and squeeze pistons are in their lowermost positions so that when a flask member 40 is placed in position its side edges will rest directly on the pattern plate and its front and rear walls will rest on the rails 39 and also on the upper surface of the pattern plate as shown in Fig. 4.

The flask supporting frame is provided at each of its corners with a depending rigid guiding pin 41; and these pins slide in the sockets 30 carried by the head 28. These guide pins assist in accurately guiding the pattern plate holding frame during the pattern drawing operation. When the flask holding frame is in its lowermost position it rests directly on the upper ends of the sockets 30 so that the said frame will partake of every movement of the jolt and squeeze piston except during the pattern drawing operation. Guide pins 41 fit accurately in their sockets in order to accurately guide the pattern holding frame and the flask holding frame during the pattern drawing operations. The sockets 35 accurately guide the plunger rods 36 and each socket is enlarged to form an oil chamber.

Extending horizontally through the base and through the lower portions of the sockets 35 are horizontal rock shafts 42, said shafts being adjacent the inner sides of the plunger rods 36. Each rock shaft carries a locking dog 43 which extends upwardly close to the adjacent plunger rod and is adapted to engage a notch in said plunger rod. The rear ends of the rock shafts extend through the base and each carries a crank arm 44, one of said arms extending upwardly and the other downwardly as shown in Fig. 2. The outer ends of these arms are connected together by a link 45 so that said rock shafts 42 will move in unison. Connected to the forward end of one of said rock shafts is an operating lever 46. Mounted on one of the rock shafts is a counter balance weight 47 which tends to throw the locking dogs out of and away from the notches in the plungers 36. The locking dogs may be thrown into engagement with the plungers 36 and out of engagement therefrom by manipulating the lever 46.

The operation of forming a mold in a machine of the type herein described is as follows:

The flask is placed in position on the pattern plate and on the flask holding frame. The flask is filled with sand and the valve turned to permit air to pass through pipe 25 to lift the jolt piston, the head 28 and the flask carrying frame, until the exhaust port 22 is uncovered. The jolting operation is continued until the sand is properly packed around the pattern. After the jolting operation the air valve is rotated to supply air through the pipe 27 under the squeeze piston. The pressure head 7 is so positioned that when the squeezing operation is completed the locking dogs 43 may be dropped into the notches in the plungers 36. When the pressing operation is complete the air valve is turned to exhaust air from beneath the piston 18. This permits the pistons, the head 28, the pattern plate holding frame and the attached pattern plate to drop, but the dogs 43 hold the flask carrying frame in its upper position. The pattern plate holding frame and the pattern plate are guided in their downward drawing movment by the four guide pins 41 and by the squeeze piston 18 moving downwardly in the cylinder 2. When the pattern drawing operation is complete the pattern is freed from the mold and the flask is supported above the pattern and is ready to be removed.

The means for automatically lifting the flask from the flask holding frame consists of a pair of lifting conveyor bars 48 extending fore-and-aft of the machine near each end of the flask holding frame close to the ends of the flask 40 and close to the ends of the flask receiving rails 39. Each bar 48 is mounted at its ends in the upper ends of depending vertically reciprocating rods 49 and 49ª. These rods are guided in depending tubular guides 50 carried by the flask supporting frame at the corners thereof. In the normal at rest position of the bars 48 they rest directly on the upper ends of the tubular sockets 50, as shown in Fig. 3. In this position of the bars they are below the lower edges of the flask walls and below the upper surfaces of the flask supporting rails and the upper surface of the pattern plate 33. The lower ends of the forward pair of rods 49 are pivotally connected to the outer ends of inwardly extending levers 51. Each of these levers is pivoted on the lower end of a depending lug 52 which is carried by the flask supporting frame. The inner end of each of the levers 51 carries an upwardly extending pin 53, said pins extending through an operating lug 54 rigidly secured to the outer marginal edge of the jolt and squeeze piston head 28. The pins 53 are provided with adjustable stop collars or nuts 55 and 56 spaced above and below the lug 54 so that the lug has a lost motion connection with the pins. The lugs 54 engage the stops 55 and 56 in the operation of the jolt piston. The lower ends of the rear pair of bars 49ª are pivotally connected to the outer ends of levers 51ª. The levers 51ª are pivoted in the lower ends of depending lugs 52ª carried by the flask supporting frame on the opposite side thereof from the lugs 52. The inner ends of the levers 51ª are connected to vertically extending pins 53 carrying adjustable stops 55 and 56 and operating through a lug 54, the pins and lug of the levers 51ª operating precisely as the corresponding pins and lug of the levers 51. The pivotal points between the levers 51ª and the lugs 52ª are somewhat closer to the reciprocating bars 49ª than are the pivotal points between the levers 51 and the lugs 52. The purpose of this is to secure a slightly greater upward movement of the rods 49 so that the forward ends of the conveyor bars or tracks 48 will be raised slightly higher than the rear ends thereof, as will be hereinafter described. Each of the bars 48 carries on its inner side a series of flanged rollers 57 which are arranged directly under and are adapted to be moved upwardly into engagement with the adjacent side edges of the flask, as shown clearly in Fig. 3. The side edges of the flask extend slightly beyond the pattern plate in order that the rollers 57 may be moved upwardly directly into contact with the flask in order to lift it, as hereinafter described. The forward ends of the track bars 48 are raised higher than the rear ends thereof in order to incline the trackway rearwardly and downwardly to permit the flasks to be readily rolled from the track bars to the roller conveyor 58 at the rear of the machine. A roller conveyor 59 is arranged at the front of the machine so that flasks may be placed thereon and rolled directly therefrom on to the track bars 48 while said bars are in their elevated position.

The large squeeze piston 18 is provided at substantially opposite points with outwardly extending horizontal pins 60. These pins move in vertical slots formed in the upper end of the cylinder 2 in which the squeeze piston reciprocates. These pins 60 are adapted to engage the upper ends of vertical rods 61 which are guided in vertical openings in the arms 4 of the base. The lower ends of these rods are rigidly secured to a horizontal cross bar 62. This cross bar is curved, as shown, to extend around the base 1 and the outer ends thereof are connected to upstanding rods 63. The upper ends of rods 63 are connected to the lower ends of the cables 16. The pins 60 and the rods 61 are so arranged that the pins 60 will engage the upper ends of the rods 61 when the squeeze piston has approached the limit of its downward movement. When the rods 61 are forced downwardly by the downward movement of the squeeze piston the shafts 10 are rocked in their bearings and the presser head 7 is swung upwardly to the position shown in Fig. 1. When the squeeze piston is moved upwardly the presser head will automatically swing down into operative position.

The operation of the flask lifting mechanism is as follows:

After the jolting operation the squeeze piston is forced upwardly for the mold squeezing operation. As the squeeze piston moves upwardly the pins 61 are free to move upwardly and this permits the presser head 7 to swing down into position for the pressing operation directly over the flask. The stops 13 and 14 arrest the head in proper position. The upward movement of the squeeze piston carries with it the jolting and squeezing head, the pattern plate, the flask holding frame and the flask. The flask lifting mechanism moves upwardly with the flask supporting frame during the jolting operation and all of this mechanism moves together and there will be no relative movement between the tracks 48 and the flask supporting frame. During the squeezing operation the tracks 48 remain in idle position below the lower edge of the flask. After the squeezing operation the handle 46 is moved to throw the locking dogs 43 into engagement with the notches in the plungers 36 to thereby lock up the flask holding frame and permit the jolt and squeeze pistons and the pattern plate to move downwardly to draw the pattern from the flask or mold. After the pattern has been drawn from the mold the lugs 54 carried by the head of the jolt piston will engage the lower stop collars 56 on pins 53 and force downwardly the inner ends of the levers 51 and 51$^a$. The lugs 52 and 52$^a$ are locked up and held stationary by the dogs 43 engaging the notches in the plungers 36. The upper ends of the levers 51 and 51$^a$ will be forced upwardly thereby moving upwardly the bars 49 and 49$^a$. The upward movement of the bars 49 and 49$^a$ will carry the tracks 48 upwardly and bring the rollers 57 into engagement with the lower edges of the sides of the flask. The continued downward movement of the jolt piston will force the flask upwardly, lifting it away from the pattern plate and above the usual guide pins, as shown in Fig. 1. Because of the arrangement of the pivots of the levers 51$^a$ the forward ends of the track bars 48 will be raised slightly higher than the rear ends. This will incline the track bars 48 slightly rearwardly and downwardly to facilitate the movement of the flask rearwardly from the track bars 48 and on to the roller conveyor 58. While the track bars are elevated a flask may be rolled from the conveyor 59 directly on to the track bar rollers and into position directly over the pattern plate. When the empty flask is properly positioned so that the guide pins on the flask holding frame will enter the apertures in the guide lugs formed on the flask, the lever 46 is operated to release the dogs from the plungers 36. This permits the flask holding frame to lower to the pattern plate. The downward movement of the flask supporting frame returns the track bars 48 to their positions of rest on the upper edges of the sockets 50, in which position they are below the flask, as hereinbefore described.

If for any reason the rods 49 and 49$^a$ stick in their sockets so that the conveyor bars 48 do not drop down to and rest upon the upper edges of the sockets of said rods 49 and 49$^a$, the downward movement of the flask holding frame will carry the levers 51 and 51$^a$ downwardly and bring the upper stops 56 into engagement with the lugs 54. The lugs 54 at this time are stationary and the result will be that the rods 49 and 49$^a$ will be pulled downwardly in their sockets to bring the bars 48 to their lowermost positions. The upper stop collars 55 are properly adjusted on their pins to ensure the track bars 48 returning to their normal lower at rest position when the flask holding frame is lowered. By varying the position of the lower stops 55 the extent of upward movement of the track 48 may be varied. It is manifest, therefore, that the forward ends of the track bars 48 may be given a slightly greater upward movement than the rear ends of said bars, by so adjusting the stop collars 56 on the pins 53 carried by the levers 51ª that they will be engaged slightly before the lug 54 at the rear of the machine engages the stop collars to lift the rear ends of the track bars.

The upper presser head is formed yoke-shape, as shown in Fig. 7, so that when it is in its non-pressing position the pressing face of the head will be out of line with the flask on the flask support. The upward swinging movement of the presser head removes it from its position directly over the flask and then there is a clear space through which sand may be dropped from an elevated hopper directly into the flask on the flask holding frame. The yoke-shape of the presser head, as a whole, is important in connection with the automatic means for rocking the presser head out of its pressing position because by that means the path through which the sand is dropped is made clear and the presser head will not interfere with the quick charging of the flask with sand.

In order to properly regulate the delivery of the flasks from the delivery conveyor track 59 to the lifting track of the machine and to properly position a delivered flask upon the lifting track with relation to the pattern plate 33, I have provided stop means upon both of said tracks to arrest the movement of the flasks. The stop means upon the track 59 comprise pivoted dogs 64 pivoted upon the outer sides of the rails 59ª of the track and formed with inwardly extending arms which carry rollers 65. One of the dogs 64 is formed with an outwardly extending operating arm 66 and said dog is operatively connected to the dog upon the opposite side of the track by means of a rod 67. This rod is so connected to the two dogs with relation to their pivots that when the operating arm 66 is pressed downwardly the dogs will be rocked out equally in unison. The outward rocking of the dogs is limited by their contact below their pivots with the side rails as shown in Fig. 11. In this position of the dogs the rollers 65 serve to accurately guide the passage of the flask from the track 59 to the flanged rollers 57 of the lifting track. Connected to the rod 67 and to one of the rails is a tension spring 68 which tends to rock the dogs inwardly to flask-stopping position. When the flask passes over to the lifting track and out from between the guide rollers 65 the springs 68 automatically snaps the dogs back into their flask-stopping position shown in Fig. 10. The rollers are then in a position to abut the forward end of the next flask and hold it.

The flask stopping means upon the lifting track comprises a dog 69 pivoted to the outer side of one of the rails 48. This dog is similar to the dogs 65 and carries a flask-engaging roller 70 and an operating arm 71. The dog is also formed with a depending lug 72 between which and the side rail is interposed a compression spring 73. This spring tends to hold the dog in flask-stopping position as shown in Fig. 1. To release the flask the dog is swung out to clear the end of the flask as shown in Fig. 12. The flask then rides past the roller until it clears it, whereupon the spring 73 automatically snaps the dog back into flask-stopping position. Owing to the fact that the rollers 57 of the lifting track are flanged, the flask will be held against transverse displacement. A single stop dog will therefore be sufficient to accurately stop the flask upon this track.

What I claim is:

1. A molding machine comprising a pattern holding means, a presser head above said holding means, a flask supporting means, means for forcing the pattern holding means and the flask supporting means upwardly to squeeze and compact the sand in the flask, means for holding the flask supporting means in an elevated position while the pattern holding means is lowered to withdraw the pattern from the mold, a shiftable flask lifting and conveying means carried by the flask supporting means normally below the flask, means for raising the forward end of the said conveying means higher than the rear end thereof to raise the flask from its supporting means and permit the flask to move rearwardly and downwardly on the conveyor away from the molding machine, and means adapted to move downwardly with the pattern holding means for automatically operating the flask lifting means.

2. A molding machine comprising a vertically reciprocable pattern holding means, a flask supporting means, means for holding the flask supporting means while the pattern holding means is lowered to withdraw the pattern from the mold, flask lifting and conveying track means normally below the flask, and means operable by the downward movement of the pattern holding means to elevate the track means into engagement with the flask and incline said track means, whereby the flask is lifted from its support and permitted to move over said inclined track means downwardly and outwardly away from the machine.

3. A molding machine comprising a vertically reciprocable pattern holding means, a flask supporting means, means for holding the flask supporting means while the pattern holding means is lowered to withdraw the pattern from the mold, a shiftable flask lifting and conveyor track, and means automatically operated by the downward movement of the pattern holding means to shift the track upwardly whereby the track engages and lifts the flask free from its support and positions it for outward movement away from the machine over the track.

4. A molding machine comprising a vertically reciprocable pattern holding means, a flask supporting means, means for holding the flask supporting means while the pattern holding means is lowered to withdraw the pattern from the mold, a shiftable flask lifting and conveyor track, and means adapted to be operated by the pattern holding means to shift the track upwardly and incline it whereby the flask is engaged by the track and lifted free from its supporting means and positioned for downward and outward movement away from the machine over the inclined track.

5. A molding machine comprising a flask support, a pattern drawing mechanism, a flask lifting and conveying means for raising the flask from its support after the pattern drawing operation whereby the flask may be moved laterally thereover outwardly from the machine, and means for automatically operating the flask lifting means by the pattern drawing mechanism.

6. A molding machine comprising a mold squeezing head, a pattern holding means, a flask supporting means, means for forcing the pattern holding means and the flask supporting means upwardly toward said head to squeeze and compact the sand in the flask, means for holding the flask supporting means in an elevated position while the pattern holding means is lowered to withdraw the pattern from the mold, vertically movable rods carried by the flask supporting means, flask conveying means carried by said rods and adapted to engage and lift the flask from its supporting means, and means carried by the pattern holding means to elevate the vertical rods as the said holding means moves downwardly.

7. A molding machine comprising a mold squeezing head, a pattern holding means, a flask supporting means, means for forcing the pattern holding means and the flask supporting means upwardly toward said head to squeeze and compact the sand in the flask, means for holding the flask supporting means in an elevated position while the pattern holding means is lowered to withdraw the pattern from the mold, vertically moving rods carried by the flask supporting means, flask conveying means carried by said vertical rods and extending fore-and-aft of the machine and adapted to engage and lift the flask from its supporting means, and means operated by the downward movement of the pattern holding means to elevate the rods at opposite ends of the flask conveying means different distances to elevate and incline the flask conveying means.

8. In a molding machine the combination of a base, an upper presser head, a vertically reciprocating mold squeezing means adapted to force the mold upwardly against said head to squeeze the mold and to then lower it away from said head, and an operative connection between the mold squeezing means and the upper presser head for automatically moving the said head away from its pressing position during the movement of the mold squeezing means to its lower position.

9. In a molding machine the combination of a base, an upper presser head, means supporting said head for swinging movement into and out of mold pressing position, a vertically reciprocating mold squeezing means adapted to force the mold upwardly against said head to squeeze the mold and to then lower it away from said head, and means controlled by the upward and downward movements respectively of said squeezing means for automatically swinging the upper presser head into and out of its pressing position.

10. In a molding machine the combination of a base, an upper presser head, means forming a fixed horizontal pivotal support for said head, a vertically reciprocating mold squeezing means adapted to force the mold upwardly against the said head to squeeze the mold and to then lower it away from said head, and an operative connection between said mold-squeezing means and the upper presser head for automatically rocking the presser head upwardly away from its pressing position during the movement of the mold squeezing means to its lower position and lowering said head into pressing position upon upward movement of said squeezing means.

11. A molding apparatus comprising a flask support, means for squeezing sand about a pattern in a flask on said support, a flask conveyor extending past said support, means for causing a relative vertical movement between said conveyor and support to separate a flask in which the sand has been squeezed from the flask support and leave it supported on the conveyor for movement away from the squeezing means, a flask supplying conveyor adjacent one end of the other conveyor and adapted to deliver a flask thereto, releasable stop means restraining delivery of a flask from the supplying conveyor, and releasable stop means for holding a flask on the first-mentioned conveyor from movement away from the squeezing means.

12. A molding apparatus comprising a flask support, means for squeezing sand about a pattern in a flask on said support, a flask conveyor extending past said support, means for causing relative vertical movement between said conveyor and support to separate a flask in which sand has been squeezed from the flask support and leave said flask supported on the conveyor for movement away from the squeezing means, a flask supplying conveyor arranged to deliver a flask to the first-mentioned conveyor for a mold squeezing operation, releasable stop means for preventing movement of a flask from the supplying conveyor until desired, and means normally urging said stop means into flask-holding position.

13. A molding apparatus comprising a flask support, means for squeezing sand about a pattern in a flask on said support, a flask conveyor extending past said support, means for causing relative vertical movement between said conveyor and support to separate a flask in which sand has been squeezed from the flask support and leave said flask supported on the conveyor for movement away from the squeezing means, a flask supplying conveyor arranged to deliver a flask to the first-mentioned conveyor for a mold squeezing operation, and releasable means for holding a flask on the supplying conveyor until it is desired to deliver the same to the first-mentioned conveyor, said releasable holding means being adapted when in release position to guide a flask in its passage from one conveyor to the other.

14. A molding apparatus comprising mold squeezing mechanism, a flask conveyor extending through the squeezing mechanism, and releasable stop means for arresting a flask on the conveyor in cooperative relation with the mold squeezing mechanism.

15. In a molding apparatus, in combination, an elevated laterally shiftable presser head, means for forcing a pattern plate and a superposed flask upwardly in unison toward said head to squeeze a mold and then lower first the pattern plate and then the flask to draw a pattern from the squeezed mold, a flask receiving and discharging conveyor movable up and down under said head, means controlled by movement of the pattern plate to normal lowered position for automatically raising said conveyor to a flask receiving and discharging position in which flasks may be moved laterally in a path above a pattern on the pattern plate out of and into position over said plate, and means whereby said conveyor may be restored to its normal lowered position to bring a flask delivered thereon into cooperative relation with the pattern plate for a mold squeezing operation.

16. In a molding apparatus, in combination, an elevated laterally shiftable presser head, means for forcing a pattern plate and a superposed flask upwardly in unison toward said head to squeeze a mold and then lower first the pattern plate and then the flask to draw a pattern from the squeezed mold, a flask receiving and discharging conveyor movable up and down under said head, means controlled by movement of the pattern plate to normal lowered position for automatically raising said conveyor to a flask receiving and discharging position in which flasks may be moved laterally in a path above a pattern on the pattern plate out of and into position over said plate, means whereby said conveyor may be restored to its normal lowered position to bring a flask delivered thereon into cooperative relation with the pattern plate for a mold squeezing operation, and automatically operating means for shifting the presser head laterally into and out of mold pressing position above the pattern plate, said means acting to hold said head laterally displaced relatively to the pattern plate while said plate is in its normal lowered position to permit filling of a flask with sand after said flask is lowered into cooperative relation with the pattern plate by said conveyor.

17. A molding machine comprising a vertically operating mold squeezing means, a flask support moved vertically by said squeezing means to squeeze the mold, a flask conveyor, and means to automatically cause a transference of a flask from the support to the conveyor by the vertical operation of the squeezing means.

18. In a molding machine the combination of a vertically reciprocable mold squeezing means, an upper presser head supported over said squeezing means, a flask support; a flask conveyor; and means whereby a single up-and-down movement of the squeezing means will first raise the flask support and the conveyor to squeeze the mold, and then relatively move the flask support and the conveyor to separate the flask from the flask support and transfer it to the conveyor.

19. In a molding machine the combination of a vertically reciprocable mold squeezing means, an upper presser head supported over said squeezing means, a flask support adapted to be moved upwardly toward said presser head by the squeezing means; a flask conveyor; means whereby the upward movement of the squeezing means will raise the said conveyor with the flask support and position it to receive a flask from the flask support; means to hold the conveyor in its raised position against downward movement; means whereby the downward movement of the squeezing means will cause a relative vertical movement of the flask support and the conveyor to free the flask from the flask support and transfer it to the conveyor; and means to release the conveyor holding means to permit it to drop to its normal lower position.

20. In a molding machine the combination of an upper presser head, a flask support, mold squeezing means operated by fluid pressure to force the flask support and a flask thereon upwardly toward said presser head to squeeze a mold and adapted to gravitate away from the head after the squeezing operation to lower the flask, a flask lifting conveyor mounted to move upwardly with the flask support and to shift vertically relatively thereto, and an operative connection between the mold squeezing means and said conveyor to automatically shift the conveyor to lift a flask from the support during the gravitational movement of the squeezing means, the conveyor being adapted to support the flask for lateral movement therealong outwardly away from the machine.

21. In a molding machine the combination of an upper presser head, a flask support, mold squeezing means operated by fluid pressure to force the flask support and a flask thereon upwardly toward said presser head to squeeze a mold and adapted to gravitate away from the head after the squeezing operation to lower the flask, and an operative connection between the squeezing means and the presser head to automatically shift the head out of vertical alinement with the supported flask when the squeezing means gravitates and to cause it to swing it into alinement with the flask when the squeezing means is forced upwardly.

22. In a molding machine the combination of an upper presser head, a flask support, mold squeezing means operated by fluid pressure to force the flask support and a flask thereon upwardly toward said presser head to squeeze a mold and adapted to gravitate away from the head after the squeezing operation to lower the flask, a flask lifting conveyor mounted to move upwardly with the flask support and to shift vertically relatively thereto, an operative connection between the mold squeezing means and said conveyor to automatically shift the conveyor to lift a flask from the support during the gravitational movement of the squeezing means, the conveyor being adapted to support the flask for lateral movement therealong outwardly away from the machine, and an operative connection between the squeezing means and the presser head to automatically shift the head out of vertical alinement with the supported flask when the squeezing means gravitates and to cause it to swing it into alinement with the flask when the squeezing means is forced upwardly.

23. In a molding machine the combination of a vertically reciprocable mold-squeezing means including a flask support, an upper presser head located over said support to have the flask and mold forced against it by said squeezing means, means supporting said presser head to swing about a horizontal axis to an inoperative position out of vertical alinement with the flask support, the head and its supporting means being formed to provide clearance for a vertical delivery of sand downwardly across the axis of the head and into the flask when the head occupies its inoperative position.

24. In a molding machine the combination of a vertically reciprocable mold-squeezing means including a flask support, an upper presser head located over said support to have the flask and mold forced against it by said squeezing means, means supporting said presser head to swing about a horizontal axis to an inoperative position out of vertical alinement with the flask support, the head and its supporting means being formed to provide clearance for a vertical delivery of sand downwardly across the axis of the head and into the flask when the head occupies its inoperative position, and an operative connection between the mold-squeezing means and the presser head to automatically swing the head to its inoperative position when the squeezing means recedes from the head.

25. In a molding machine the combination of a vertically reciprocable mold squeezing means, an upper presser head supported over said squeezing means, a flask support adapted to be moved upwardly toward said presser head by the squeezing means, a flask lifting conveyor mounted to move vertically with the support and to be shifted vertically relatively to it, means to arrest the descent of the flask support and conveyor when the squeezing means recedes from the presser head, and an operative connection between the squeezing means and the conveyor to automatically shift the conveyor to separate a flask from the support as the descent of the squeezing means continues, the conveyor being adapted to support the separated flask for lateral delivery therealong away from the machine.

26. In a molding machine the combination of a vertically reciprocable mold squeezing means, an upper presser head supported over said squeezing means, a flask support adapted to be moved upwardly toward said presser head by the squeezing means, a flask lifting conveyor, and means operable by a vertical movement of the squeezing means to automatically cause a relative vertical movement between the flask support and said conveyor and cause the conveyor and a flask on the support to be brought into engagement with each other after the squeezing of the mold in the flask and the flask thereby separated from the support and transferred to the conveyor, the conveyor being adapted to support the separated flask for lateral delivery thereon outwardly away from the machine.

27. A molding machine comprising a mold squeezing and pattern drawing means, a pattern holding means, a flask supporting means, means for holding the flask supporting means to withdraw the pattern from the mold, shiftable flask lifting and conveying means for raising the flask free from the flask supporting means and positioning it for outward movement away from the machine over said conveying means, and means adapted to be automatically operated by the pattern drawing movement of the machine to operate the flask lifting means.

28. A molding machine comprising a pattern plate holding means, a flask supporting means, means for forcing the pattern plate holding means and the flask supporting means upwardly to squeeze and compact the sand in the flask, means for holding the flask supporting means in an elevated position while the pattern holding means is lowered to withdraw the pattern from the mold, means mounted on the flask supporting means for lifting the flask from the flask supporting means, said lifting means comprising a pair of lifting and conveyor bars carrying a series of rollers adapted to engage the end walls of the flask, said bars in their elevated position inclining rearwardly and downwardly, and means carried by the pattern plate holding means and adapted to operate the lifting means as said holding means moves downwardly.

29. A molding machine comprising a pattern plate holding means, a flask supporting means, means for forcing the pattern plate holding means and the flask supporting means upwardly to squeeze and compact the sand in the flask, means for holding the flask supporting means in an elevated position while the pattern holding means is lowered to withdraw the pattern from the mold, and flask lifting and conveying means mounted on the flask supporting means for raising the flask free from the flask supporting means and positioning it for outward movement from the machine over the conveying means, and means for automatically operating the flask lifting means by the downward movement of the pattern plate holding means.

30. In a molding machine the combination of a support, a squeeze piston mounted therein, a jolt piston within the squeeze piston, a pattern plate holding means carried by the squeeze piston, a flask supporting means, means for operating the jolt piston for the jolting operation, means for moving the squeeze piston upwardly for the squeezing operation, an upper presser head, and means operated by the downward movement of the squeeze piston to move the upper presser head away from its squeezing position.

31. In a molding machine the combination of a support, a squeeze piston mounted therein, a jolt piston within the squeeze piston, a pattern plate holding means carried by the squeeze piston, a flask supporting means, means for operating the jolt piston for the jolting operation, means for moving the squeeze piston upwardly for the squeezing operation, means whereby the upward movement of the squeeze piston will carry with it the pattern plate holding means and the flask supporting means, means for locking up the flask supporting means to permit the pattern plate holding means to move downwardly to withdraw the pattern from the mold, an upper presser head, and means operated by the downward movement of the squeeze piston to move the upper presser head away from its squeezing position.

32. In a molding machine the combination of a support, a squeeze piston mounted therein, a jolt piston within the squeeze piston, a pattern plate holding means carried by the squeeze piston, a flask supporting means, means for operating the jolt piston for the jolting operation, means for moving the squeeze piston upwardly for the squeezing operation, means whereby the upward movement of the squeeze piston will carry with it the pattern plate holding means and the flask supporting means, means for locking up the flask supporting means to permit the pattern plate holding means to move downwardly to withdraw the pattern from the mold, an upper presser head, and means operated by the downward movement of the squeeze piston to move the upper presser head upwardly away from its squeezing position.

33. In a molding machine the combination of a support, a squeeze piston mounted therein, a jolt piston within the squeeze piston, a pattern plate holding means carried by the squeeze piston, a flask supporting means, means for operating the jolt piston for the jolting operation, means for moving the squeeze piston upwardly for the squeezing operation, means whereby the upward movement of the squeeze piston will carry with it the pattern plate holding means and the flask supporting means, means for locking up the flask supporting means to permit the pattern plate holding means to move downwardly to withdraw the pattern from the mold, an upper presser head, and means operated by the downward movement of the squeeze piston to rock the upper presser head upwardly and away from its squeezing position.

34. A foundry machine comprising a flask support, a pattern drawing mechanism, a flask conveyor track, and means operated by the pattern drawing mechanism to cause a relative vertical movement between said track and the flask support whereby the flask is separated from the support and is supported by the flask conveyor track and may be moved over it laterally relatively to the support.

35. In a foundry apparatus the combination of a flask support, a flask conveyor track, means to cause a relative vertical movement between the said track and the flask support whereby the flask is separated from the support and is supported by said conveyor track and may be moved over it laterally relatively to the support, and releasable stop means adapted to operate automatically to arrest the movement of a flask upon the track.

In testimony whereof I hereunto affix my signature.

WILLIAM H. NICHOLLS.